US012717026B2

(12) United States Patent
Hirai

(10) Patent No.: US 12,717,026 B2
(45) Date of Patent: Aug. 25, 2026

(54) VEHICLE POSITION ESTIMATING DEVICE, VEHICLE POSITION ESTIMATING SYSTEM, AND VEHICLE POSITION ESTIMATING METHOD

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventor: Masataka Hirai, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 60 days.

(21) Appl. No.: 18/764,592

(22) Filed: Jul. 5, 2024

(65) Prior Publication Data

US 2025/0085418 A1 Mar. 13, 2025

(30) Foreign Application Priority Data

Sep. 8, 2023 (JP) ................................ 2023-146079

(51) Int. Cl.
*G01S 13/931* (2020.01)

(52) U.S. Cl.
CPC ..... *G01S 13/931* (2013.01); *G01S 2013/9316* (2020.01); *G01S 2013/932* (2020.01)

(58) Field of Classification Search
CPC ......... G01C 21/28; G01S 13/06; G01S 13/86; G01S 13/865; G01S 13/867; G01S 17/06;
(Continued)

(56) References Cited

U.S. PATENT DOCUMENTS 10,247,830 B2 * 4/2019 Hosoya .................. G01C 21/28
11,898,851 B2 * 2/2024 Lee ........................... G06T 7/73
(Continued)

FOREIGN PATENT DOCUMENTS

JP 2011058909 A 3/2011
JP 2022099600 A 7/2022

*Primary Examiner* — Christopher George Fees
(74) *Attorney, Agent, or Firm* — Posz Law Group, PLC

(57) ABSTRACT

A vehicle position estimating device includes a coordinates obtaining unit, a map information obtaining unit, a surrounding information obtaining unit, a vehicle position estimating unit, a relative position estimating unit, and a correcting unit. The coordinates obtaining unit obtains coordinates of a first vehicle. The map information obtaining unit obtains map information including the coordinates obtained by the coordinates obtaining unit. The surrounding information obtaining unit obtains surrounding information indicating a reference around the first vehicle that is detected by a surrounding sensor. The vehicle position estimating unit estimates a first vehicle position using the map information and the surrounding information. The relative position estimating unit estimates a relative position of a second vehicle around the first vehicle with respect to the first vehicle. The correcting unit corrects the first vehicle position using the relative position and a second vehicle position obtained from the second vehicle.

22 Claims, 5 Drawing Sheets

(58) Field of Classification Search
CPC ........ G01S 17/86; G01S 17/931; G01S 19/48; G01S 19/485
See application file for complete search history.

(56) References Cited

U.S. PATENT DOCUMENTS

| | | | | |
|---|---|---|---|---|
| 2013/0093618 | A1* | 4/2013 | Oh | G01S 19/45 342/357.44 |
| 2015/0378015 | A1* | 12/2015 | You | G01S 13/06 701/469 |
| 2018/0093667 | A1* | 4/2018 | Tezuka | G08G 1/123 |
| 2019/0035271 | A1* | 1/2019 | Jain | G08G 1/123 |
| 2019/0072674 | A1* | 3/2019 | Otaki | G01S 19/47 |
| 2019/0120630 | A1* | 4/2019 | Tsurumi | G05D 1/0278 |
| 2019/0137269 | A1* | 5/2019 | Broere | G01C 11/34 |
| 2019/0271550 | A1* | 9/2019 | Breed | G01C 21/3811 |
| 2020/0041657 | A1 | 2/2020 | Nishimura et al. | |
| 2020/0191975 | A1* | 6/2020 | Watanabe | G01S 19/13 |
| 2020/0386566 | A1 | 12/2020 | Ito et al. | |
| 2021/0074151 | A1* | 3/2021 | Stählin | G01S 19/46 |
| 2022/0026566 | A1* | 1/2022 | Guo | H04W 4/46 |
| 2022/0113740 | A1* | 4/2022 | Knutson | G01S 19/41 |
| 2023/0243657 | A1* | 8/2023 | Kiyohara | H04W 4/029 701/446 |

* cited by examiner

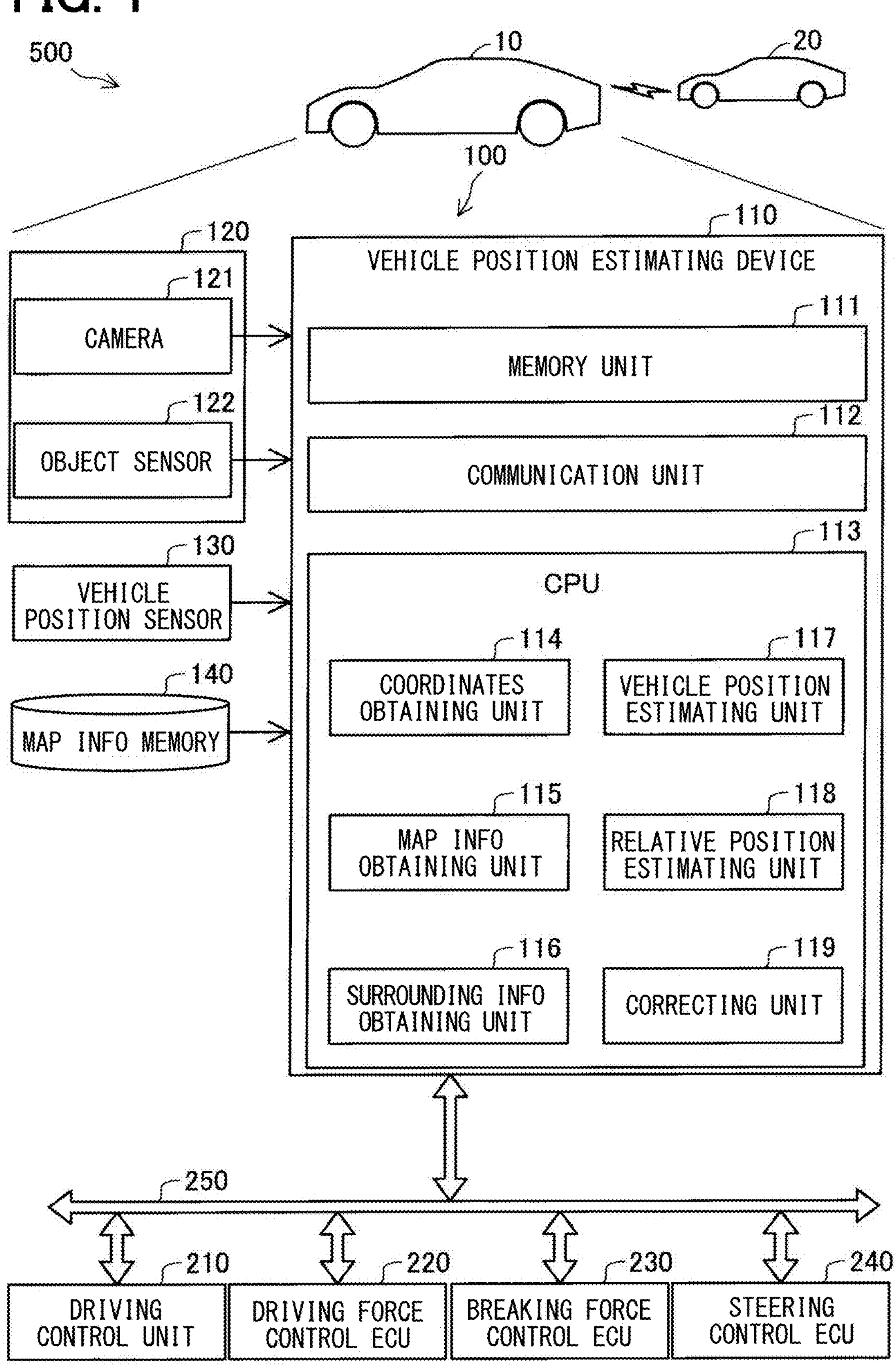
FIG. 1
500
10
20
100
110
VEHICLE POSITION ESTIMATING DEVICE
111
MEMORY UNIT
112
COMMUNICATION UNIT
113
CPU
114
COORDINATES OBTAINING UNIT
117
VEHICLE POSITION ESTIMATING UNIT
115
MAP INFO OBTAINING UNIT
118
RELATIVE POSITION ESTIMATING UNIT
116
SURROUNDING INFO OBTAINING UNIT
119
CORRECTING UNIT
120
121
CAMERA
122
OBJECT SENSOR
130
VEHICLE POSITION SENSOR
140
MAP INFO MEMORY
250
210
DRIVING CONTROL UNIT
220
DRIVING FORCE CONTROL ECU
230
BREAKING FORCE CONTROL ECU
240
STEERING CONTROL ECU

VEHICLE POSITION ESTIMATING DEVICE, VEHICLE POSITION ESTIMATING SYSTEM, AND VEHICLE POSITION ESTIMATING METHOD

CROSS REFERENCE TO RELATED APPLICATION

This application is based on Japanese Patent Application No. 2023-146079 filed on Sep. 8, 2023, the disclosure of which is incorporated herein by reference in its entirety.

TECHNICAL FIELD

The present disclosure relates to a vehicle position estimating device, a vehicle position estimating system, and a vehicle position estimating method.

BACKGROUND

There is a vehicle position estimating device that estimates a position of a vehicle using positioning information from a Global Navigation Satellite System(s) (GNSS).

SUMMARY

A vehicle position estimating device is provided. The vehicle position estimating device includes a coordinates obtaining unit, a map information obtaining unit, a surrounding information obtaining unit, a vehicle position estimating unit, a relative position estimating unit, and a correcting unit. The coordinates obtaining unit is configured to obtain coordinates of a first vehicle. The map information obtaining unit is configured to obtain map information including the coordinates obtained by the coordinates obtaining unit. The surrounding information obtaining unit is configured to obtain surrounding information indicating a reference around the first vehicle. The reference is detected by a surrounding sensor installed in the first vehicle. The vehicle position estimating unit is configured to estimate a position of the first vehicle as a first vehicle position using the map information and the surrounding information. The relative position estimating unit is configured to estimate a relative position of a second vehicle around the first vehicle with respect to the first vehicle using the surrounding information. The correcting unit is configured to correct the first vehicle position using the relative position and a second vehicle position that is a position of the second vehicle obtained from the second vehicle.

BRIEF DESCRIPTION OF THE DRAWINGS

FIG. 1 is a schematic diagram showing the configuration of a vehicle position estimating system.

DESCRIPTION OF EMBODIMENTS

Figure 2:
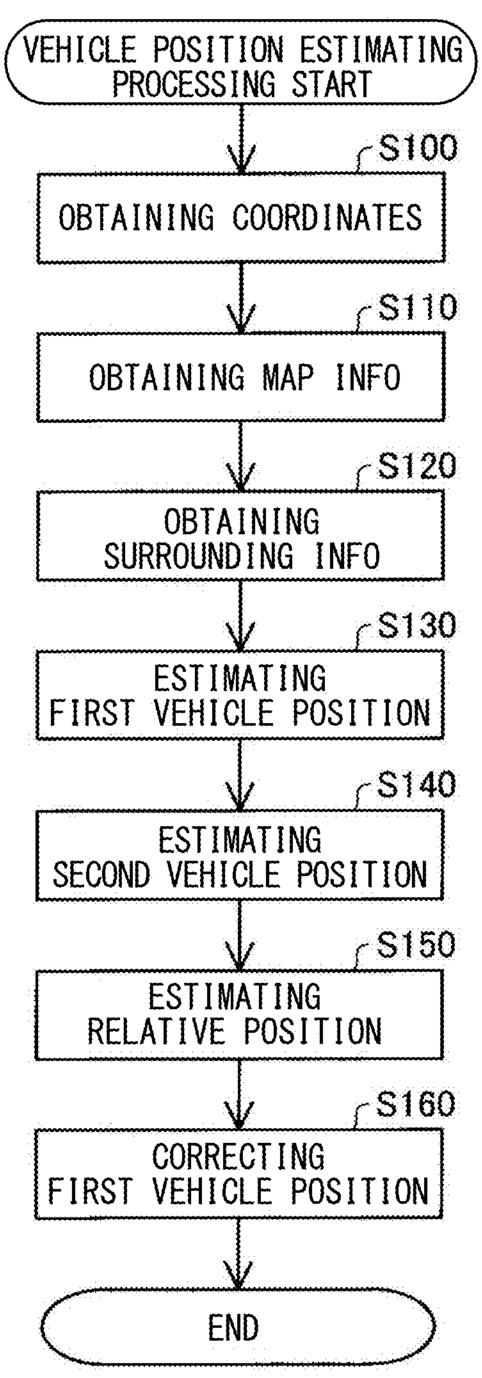
FIG. 2 is a flowchart showing an example of vehicle position estimating processing.

To begin with, examples of relevant techniques will be described.

There is a vehicle position estimating device that estimates a position of a vehicle using positioning information from a Global Navigation Satellite System(s) (GNSS) such as a Global Positioning System (GPS). For example, there is a technique for sharing the self-position of the vehicle that is estimated by the vehicle with a terminal installed in the vehicle.

Urban areas crowded with people, buildings, and vehicles lower an accuracy of positioning using GNSS and an accuracy of a vehicle position that is estimated using map information and surrounding information around the vehicle which is obtained by sensors installed in the vehicle. Thus, there is a need to estimate a vehicle position with high accuracy.

The present disclosure has been made to solve the above problems and can be implemented as the following embodiments.

According to one aspect of the present disclosure, a vehicle position estimating device is provided. The vehicle position estimating device includes a coordinates obtaining unit, a map information obtaining unit, a surrounding information obtaining unit, a vehicle position estimating unit, a relative position estimating unit, and a correcting unit. The coordinates obtaining unit is configured to obtain coordinates of a first vehicle. The map information obtaining unit is configured to obtain map information including the coordinates obtained by the coordinates obtaining unit. The surrounding information obtaining unit is configured to obtain surrounding information indicating a reference around the first vehicle. The reference is detected by a surrounding sensor installed in the first vehicle. The vehicle position estimating unit is configured to estimate a position of the first vehicle as a first vehicle position using the map information and the surrounding information. The relative position estimating unit is configured to estimate a relative position of a second vehicle around the first vehicle with respect to the first vehicle using surrounding information. The correcting unit is configured to correct the first vehicle position using the relative position and a second vehicle position that is a position of the second vehicle obtained from the second vehicle.

The vehicle position estimating device of this disclosure corrects the first vehicle position using the second vehicle position and the relative position. Thus, the vehicle position estimating device can estimate the first vehicle position more accurately.

A. First embodiment: As shown in FIG. 1, a vehicle position estimating system 500 includes a first vehicle 10, a second vehicle 20, and a vehicle position estimating device 110. In this embodiment, the vehicle position estimating device 110 is installed in the first vehicle 10. The vehicle position estimating device 110 estimates the position of the first vehicle (hereinafter, referred to as a first vehicle position). The second vehicle 20 is a vehicle around the first vehicle 10. The vehicle position estimating system 500 is used in built-up and crowded environments with people and vehicles, which lower the accuracy of Global Navigation Satellite System (GNSS) based positioning. The vehicle position estimating system 500 can estimate the first vehicle position in such environment.

The first vehicle 10 of this embodiment includes an autonomous driving control system 100. In this embodiment, the autonomous driving control system 100 performs autonomous driving of the first vehicle 10. In this embodiment, the autonomous driving control system 100 includes a vehicle position estimating device 110, a surrounding sensor 120, a vehicle position sensor 130, a map information memory 140, a driving control unit 210, a driving force control Electronic Control Unit (ECU) 220, a braking force control ECU 230, and a steering control ECU 240. The vehicle position estimating device 110, the driving force control ECU 220, the braking force control ECU 230, and the steering control ECU 240 are connected via an in-vehicle network 250. The first vehicle 10 is not limited to autonomous driving and may be driven manually by a driver.

The surrounding sensor 120 is a sensor that can detect references located around the first vehicle 10. The surrounding sensor 120 includes a camera 121 and an object sensor 122. The camera 121 captures the peripheral of the first vehicle 10 to obtain an image. The object sensor 122 detects objects around the first vehicle 10. Examples of the object sensor 122 include Light Detection and Ranging (LiDAR) and millimeter-wave radar that use reflected waves. In this embodiment, the object sensor 122 identifies an object around the first vehicle 10 and measures the distance to the object. The object sensor 122 may only measure the distance to the object around the first vehicle 10 and a downstream device may identify the object using the measured point cloud information.

The vehicle position sensor 130 detects the current coordinate position of the first vehicle 10. An example of the vehicle position sensor 130 includes GNSS such as Global Positioning System (GPS).

The map information memory 140 stores map information. “Map information” is information such as the positions of various features and the positions of roads. In this embodiment, the map information is three-dimensional information including latitude and longitude information.

The vehicle position estimating device 110 includes a memory 111, a communication unit 112, and a CPU 113. The CPU 113 executes a program pre-installed in the memory 111 to realize functions of a coordinates obtaining unit 114, a map information obtaining unit 115, a surrounding information obtaining unit 116, a vehicle position estimating unit 117, a relative position estimating unit 118, and a correcting unit 119. However, some or all of the functions of these units may be realized by hardware circuits. The vehicle position estimating device 110 notifies the driving control unit 210 of the estimated vehicle position.

The communication unit 112 executes vehicle-to-vehicle communication with the second vehicle 20. The first vehicle 10 can obtain various information from the second vehicle 20 through the vehicle-to-vehicle communication. The communication unit 112 may perform at least one of wireless communication with an Intelligent Transport System, vehicle-to-vehicle communication with the second vehicle 20, and road-to-vehicle communication with roadside radio equipment installed on road facilities.

The coordinates obtaining unit 114 obtains the current coordinates of the first vehicle 10 from the vehicle position sensor 130.

The map information obtaining unit 115 obtains map information including the coordinates, which is obtained by the coordinate obtaining unit 114, from the map information memory 140. That is, the map information obtaining unit 115 obtains three-dimensional information of features estimated to exist around the first vehicle 10.

The surrounding information obtaining unit 116 obtains surrounding information indicating coordinates of a reference located around the first vehicle 10. The coordinates of the reference are detected by the surrounding sensor 120 mounted on the first vehicle 10.

The vehicle position estimating unit 117 estimates the first vehicle position using the map information and the surrounding information. More specifically, the vehicle position estimating unit 117 estimates the first vehicle position from the positional relationship between the first vehicle 10 and objects around the first vehicle 10 using the map information and the surrounding information. This increases the accuracy of the estimated first vehicle position compared to the coordinate position of the first vehicle 10 obtained from the vehicle position sensor 130.

The relative position estimating unit 118 estimates the relative position of the second vehicle 20, which is around the first vehicle 10, with respect to the first vehicle 10 using the surrounding information. The relative position is represented by coordinates.

The correcting unit 119 corrects the first vehicle position using the position of the second vehicle (hereinafter, referred to as a second vehicle position). The second vehicle position is obtained from the second vehicle 20. In this embodiment, the correcting unit 119 obtains the second vehicle position from the second vehicle 20 via the communication unit 112. In this embodiment, the second vehicle position is a coordinate position detected by a vehicle position sensor installed in the second vehicle 20.

The driving control unit 210 is mainly composed of a microcontroller constituted by a central processing unit (CPU), RAM, and ROM, and realizes an autonomous driving by the microcontroller executing a pre-installed program. The driving control unit 210 realizes an autonomous driving for traveling along a predetermined route by controlling the driving force control ECU 220, the braking force control ECU 230, and the steering control ECU 240 based on the first vehicle position received from the vehicle position estimating device 110. For example, the driving control unit 210 controls the driving force control ECU 220 and the braking force control ECU 230, and uses the steering control ECU 240 to change lanes automatically.

The driving force control ECU 32 is an electronic control device that controls a power source that generates driving force for the vehicle, such as an engine. When the driver operates the vehicle manually, the driving force control ECU 220 controls the power source, such as the engine and the electric motor, in accordance with the amount of accelerator pedal operation. When performing autonomous driving, the driving force control ECU 220 controls the power source in accordance with the required driving force calculated by the driving control unit 210.

The braking force control ECU 230 is an electronic control unit that controls a brake actuator that generates a braking force for the first vehicle 10. When the driver operates the vehicle manually, the braking force control ECU 230 controls the brake actuator in accordance with the amount of brake pedal operation. When performing autonomous driving, the braking force control ECU 230 controls the brake actuator in accordance with the required braking force calculated by the driving control unit 210.

The steering control ECU 240 is an electronic control device that controls a motor that generates a steering torque for the first vehicle 10. When the driver operates the vehicle manually, the steering control ECU 240 controls the motor in response to the operation of the steering wheel to generate an assist torque for the steering operation. This allows the driver to operate the steering wheel with a small amount of force, thereby achieving steering of the first vehicle 10. When performing autonomous driving, the steering control ECU 240 performs steering by controlling the motor according to the required steering angle calculated by the driving control unit 210.

The vehicle position estimating processing shown in FIG. 2 is processing of estimating the first vehicle position by the vehicle position estimating device 110. This processing is repeatedly executed by the vehicle position estimating device 110 while the first vehicle 10 is traveling, for example, every 100 ms.

In step S100, the vehicle position estimating device 110 obtains the current coordinates of the first vehicle 10 from the vehicle position sensor 130. This step is referred to as a "coordinates obtaining step or obtaining coordinates".

In step S110, the vehicle position estimating device 110 obtains from the map information memory 140 map information including the coordinates obtained in step S100. This step is referred to as a "map information obtaining step or obtaining map information".

In step S120, the vehicle position estimating device 110 obtains surrounding information from the surrounding sensor 120. This step is referred to as a "surrounding information obtaining step or obtaining surrounding information. Note that steps S100, S110, and S120 are not limited to this order, and may be performed in any order or in parallel, as long as step S110 is performed after step S100.

In step S130, the vehicle position estimating device 110 estimates the first vehicle position using the map information obtained in step S110 and the surrounding information obtained in step S120. This step is referred to as a "vehicle position estimating step or estimating vehicle position".

In step S140, the vehicle position estimating device 110 obtains the second vehicle position indicating the position of the second vehicle 20. This step is referred to as a "second vehicle position obtaining step or obtaining the second vehicle position".

In step S150, the vehicle position estimating device 110 estimates the relative position of the second vehicle 20 with respect to the first vehicle 10, using the surrounding information obtained in step S120. This step is referred to as a "relative position estimating step or estimating relative position". In this embodiment, the vehicle position estimating device 110 identifies, as the second vehicle 20, the vehicle that is estimated to be located at the second vehicle position among the vehicles indicated to be located around the first vehicle 10 by the surrounding information obtained in step S140. The vehicle position estimating device 110 estimates the relative position of the identified second vehicle 20 with respect to the first vehicle 10 using the surrounding information.

In step S160, the vehicle position estimating device 110 corrects the first vehicle position estimated in step S130 using the second vehicle position obtained in step S140 and the relative position estimated in step S150. This step is referred to as a "correcting step". More specifically, the vehicle position estimating device 110 corrects the first vehicle position, for example, to a position between the first vehicle position estimated in step S130 and the position of the first vehicle 10 estimated using the second vehicle position and the relative position.

The correcting method is not limited to the above. The correcting unit 119 may correct the first vehicle position to the center of gravity of a polygon or the midpoint of a line segment. The polygon and the line segment are obtained by connecting the current coordinates of the first vehicle 10 obtained by the coordinates obtaining unit 114, the first vehicle position estimated by the vehicle position estimating unit 117, and the position of the first vehicle 10 estimated using the second vehicle position and the relative position.

According to the vehicle position estimating device 110 of the present embodiment described above, the first vehicle position is corrected using the second vehicle position and the relative position. Thus, the vehicle position estimating device can estimate the first vehicle position more accurately.

B. Second embodiment: The vehicle position estimating processing of the second embodiment differs from that of the first embodiment in the processing of step S160, and other steps are the same. In the second embodiment, the first vehicle position is corrected using the accuracy of the first vehicle position and the accuracy of the second vehicle position. The configuration of the vehicle position estimating device 110 of the second embodiment is the same as that of the first embodiment, thus a description thereof will be omitted.

Hereinafter, the accuracy of the first vehicle position is referred to as a first accuracy, and the accuracy of the second vehicle position is referred to as a second accuracy. In this embodiment, the first accuracy and the second accuracy are reception strength of the GNSS signal, represented, for example, by Signal to Noise Ratio (SNR) or Carrier to Noise density ratio (C/NO).

The correcting unit 119 corrects the first vehicle position using the first accuracy indicating the accuracy of the first vehicle position and the second accuracy indicating the accuracy of the second vehicle position. More specifically, a provisional first vehicle position is defined as the first vehicle position estimated by the vehicle position estimating unit 117 in step S130 and a new first vehicle position is defined as the position of the first vehicle 10 estimated using the second vehicle position and the relative position. When the first accuracy is higher than the second accuracy, the correcting unit 119 shifts the first vehicle position to a corrected position closer to the provisional first vehicle position than to the new first vehicle position. When the second accuracy is higher than the first accuracy, the correcting unit 119 shifts the first vehicle position to a corrected position closer to the new first vehicle position than to the provisional first vehicle position. The correcting unit 119 may correct the first vehicle position in the following manner. The corrected position is on a straight line between the provisional first vehicle position and the new first vehicle position. A distance between the corrected position and the provisional first vehicle position is defined as a first distance and a distance between the corrected position and the new first vehicle position is defined as a second distance. The correcting unit 119 sets the corrected position such that a ratio of the first distance to the second distance is equal to a ratio of the first accuracy to the second accuracy.

The vehicle position estimating device 110 of the second embodiment described above uses a vehicle position having high accuracy to correct the first vehicle position. Thus, the accuracy of the first vehicle position can be improved.

Figure 3:
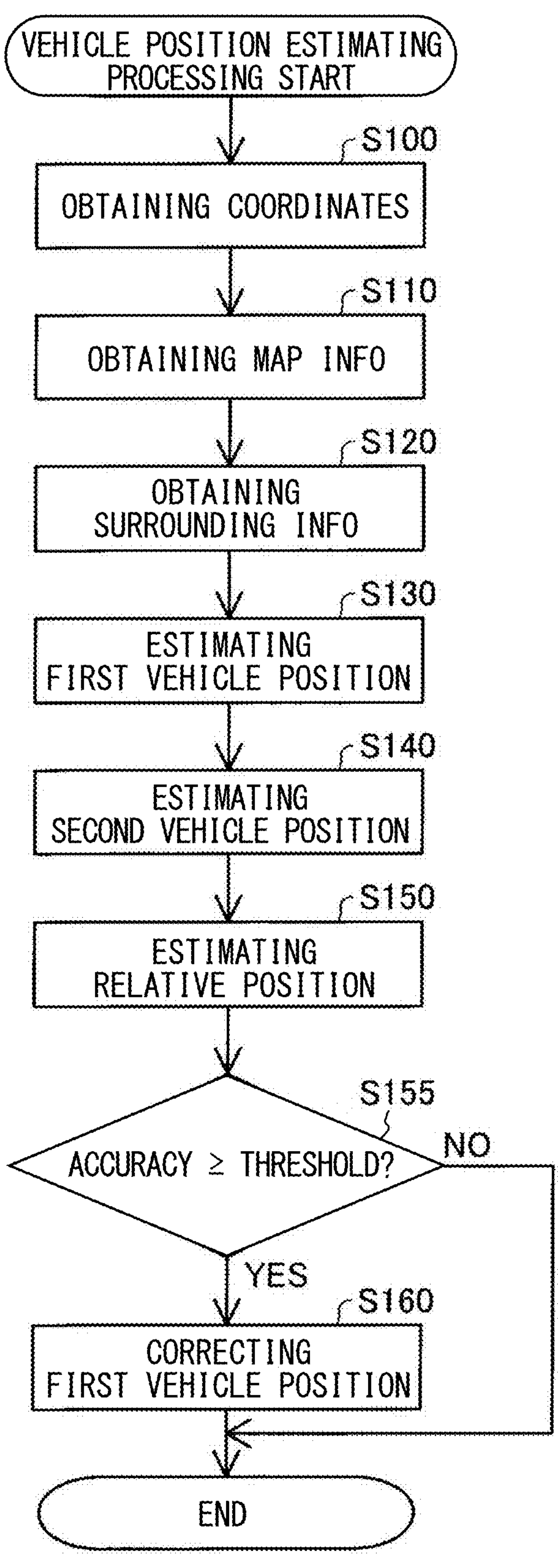
FIG. 3 is a flowchart showing an example of vehicle position estimating processing according to the third embodiment.

C. Third embodiment: The vehicle position estimating processing of the third embodiment shown in FIG. 3 differs from that of the second embodiment in step S160, and other steps are the same. In the third embodiment, step S160 is executed when the accuracy of the second vehicle position is equal to or greater than a predetermined threshold. Since the configuration of the vehicle position estimating device 110 of the third embodiment is the same as that of the second embodiment, a description thereof will be omitted.

In step S155, the vehicle position estimating device 110 determines whether the second accuracy is equal to or greater than a threshold. The threshold may be a value that is experimentally or empirically determined in advance, or may be a value that is calculated based on a map or function that defines the relationship between the first accuracy and the threshold. In this embodiment, the threshold is the value of the first accuracy. When the second accuracy is equal to or greater than the threshold, that is, when the second accuracy is equal to or greater than the first accuracy, the vehicle position estimating device 110 advances to processing of step S160. When the second accuracy is less than the threshold, that is, when the second accuracy is less than the first accuracy, the vehicle position estimating process is ended.

According to the vehicle position estimating device 110 of the third embodiment described above, when the second accuracy is equal to or greater than the threshold, the first vehicle position is corrected, thereby improving the accuracy of the first vehicle position. Using the first accuracy as the threshold improves the accuracy of the first vehicle position.

Figure 4:
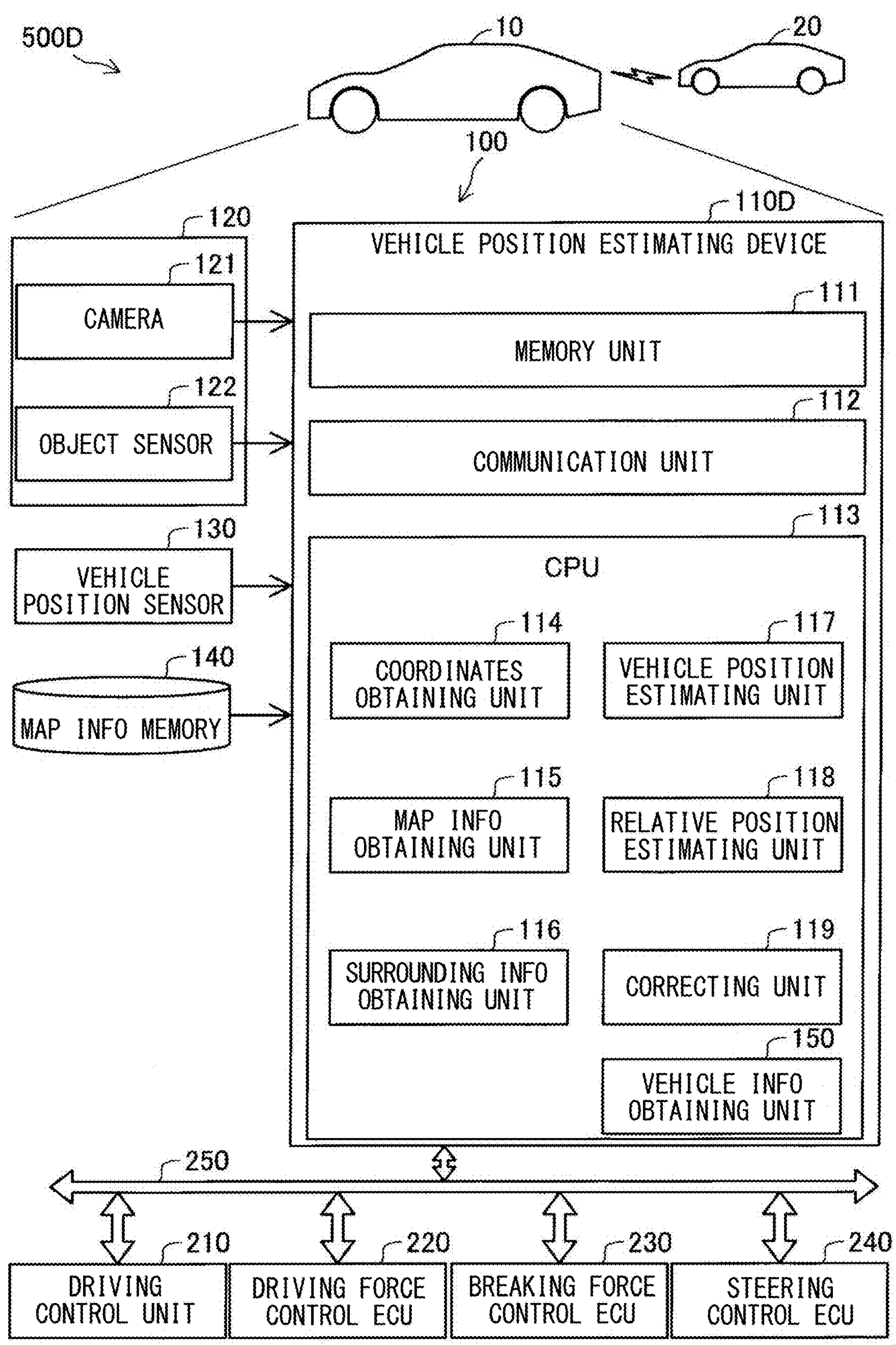
FIG. 4 is a schematic diagram showing the configuration of a vehicle position estimating system according to the fourth embodiment.

D. Fourth embodiment: A vehicle position estimating system 500D of the fourth embodiment shown in FIG. 4 differs from the first embodiment in that a vehicle position estimating device 110D includes a vehicle information obtaining unit 150. The other configurations are the same.

The vehicle information obtaining unit 150 obtains second vehicle information including at least one of the vehicle type of the second vehicle 20 and the size of the second vehicle 20. The second vehicle information is transmitted from the second vehicle 20 together with the second vehicle position.

In this embodiment, the relative position estimating unit 118 uses the surrounding information and the second vehicle information to identify the second vehicle 20 among the vehicles around the first vehicle 10, and estimates the relative position. More specifically, the relative position estimating unit 118 identifies, as the second vehicle 20, the vehicle that matches the second vehicle information among the vehicles around the first vehicle 10 indicated by the surrounding information. The relative position estimating unit 118 estimates the relative position of the identified second vehicle 20 with respect to the first vehicle 10 using the surrounding information.

According to the vehicle position estimating device 110D of the fourth embodiment described above, the second vehicle 20 is identified using the second vehicle information, so that the second vehicle 20 can be identified with high accuracy among the vehicles located around the first vehicle 10.

E. Other Embodiments: (E1) In the above-described embodiments, the vehicle position estimating device 110 is installed in the first vehicle 10. Without being limited thereto, the vehicle position estimating device 110 may be installed, for example, in a server provided outside the first vehicle 10 or in a transportation infrastructure.

(E2) In the above-described embodiments, the vehicle position estimating system 500 may include multiple second vehicles 20. In this case, the vehicle position estimating device 110 corrects the first vehicle position using the second vehicle positions and the relative positions of the second vehicles 20. More specifically, the relative position estimating unit 118 estimates the relative position of each of the multiple second vehicles 20 with respect to the first vehicle 10. The correcting unit 119 corrects the first vehicle position using each of the second vehicle positions of the multiple second vehicles 20 and each of the relative positions of the second vehicles 20 estimated by the relative position estimating unit 118. For example, the correcting unit 119 corrects the first vehicle position to the center of gravity of a polygon or the midpoint of a line segment obtained by connecting new first vehicle positions, which are the positions of the first vehicle 10 estimated using the multiple second vehicle positions and the multiple relative positions, and the provisional first vehicle position, which is the first vehicle position estimated in step S130. In this case, in the second and third embodiments, the first vehicle position may be corrected using the particular second vehicle position with the highest second accuracy and the relative position thereof.

Figure 5:
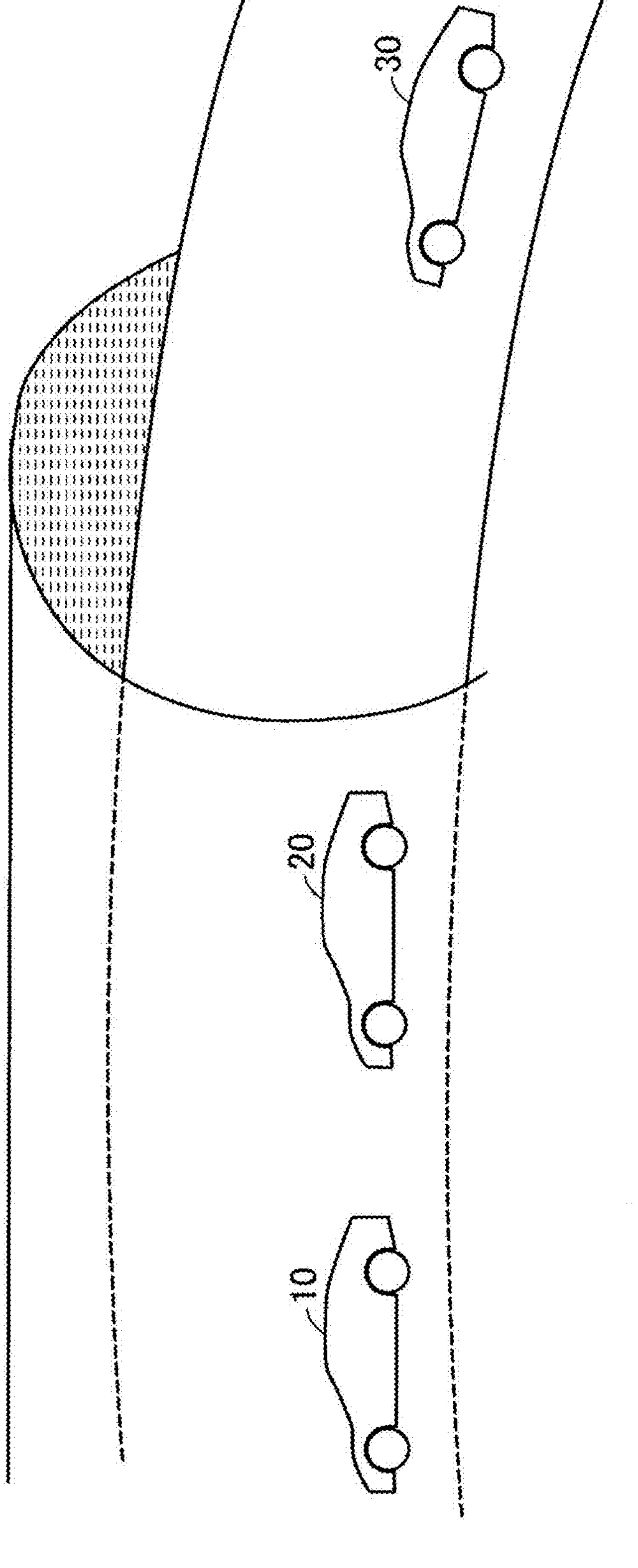
FIG. 5 is a diagram showing an example of a positional relationship between a first vehicle and a second vehicle.

(E3) In the above-described embodiments, the second vehicle position is a coordinate position detected by a vehicle position sensor provided in the second vehicle 20. Without being limited to this, the second vehicle position may be obtained like the first vehicle position. That is, a coordinate position of the second vehicle that is detected by the vehicle position sensor in the second vehicle 20 may be corrected by the vehicle position estimating device 110 using the position of another vehicle and the relative position of the other vehicle with respect to the second vehicle 20. The vehicle positions may be corrected in a chain reaction. As shown in FIG. 5, when the first vehicle 10 and the second vehicle 20 are traveling inside a tunnel and a third vehicle 30 is traveling outside the tunnel, the vehicle position estimating device 110 can correct the first vehicle position using the coordinate position that is detected by a vehicle position sensor of the third vehicle 30 located outside the tunnel through the second vehicle 20. Also, even in a highly congested environment due to traffic congestion, the first vehicle position can be corrected using a vehicle position that is estimated by another vehicle located in a less congested environment.

(E4) In the above-described embodiments, the vehicle position estimating device 110 may obtain from the second vehicle 20 the position of the third vehicle 30 that the second vehicle obtains from the third vehicle 30 and the relative position of the third vehicle 30 with respect to the second vehicle 20 in addition to the second vehicle position. The correcting unit 119 may correct the first vehicle position to the center of gravity of a polygon or the midpoint of a line segment obtained by connecting the new first vehicle position, which is the position of the first vehicle 10 estimated using the second vehicle position and the relative position, a quasi-first vehicle position, which is the position of the first vehicle 10 estimated using the position of the third vehicle and the relative position of the third vehicle to the second vehicle 10, and the provisional first vehicle position, which is the first vehicle position estimated in step S130.

(E5) In the second and third embodiments described above, the first accuracy and the second accuracy are the strength of the signal received by the vehicle position sensor. Without being limited to this, the first accuracy and the second accuracy may be, for example, the degree of agreement between the current coordinate position of the vehicle obtained from the vehicle position sensor and the current coordinate position of the vehicle estimated using map information and surrounding information. In this case, the second vehicle position is estimated like the first vehicle position. That is, the second vehicle position is estimated using map information including the coordinate position detected by the vehicle position sensor installed in the second vehicle 20 and surrounding information indicating a reference around the second vehicle 20. The first accuracy and the second accuracy may be values that are determined according to a predetermined parameter. The parameters include, for example, weather and vehicle speed. When weather is adopted as the parameter, the first accuracy and the second accuracy in fine weather may be set to higher values than those in rainy weather. When vehicle speed is used as the parameter, the first accuracy and the second accuracy may be calculated based on, for example, a map or a function that defines the relationship between vehicle speed and accuracy. Additionally, the first accuracy and the second accuracy may be set by these combinations.

(E6) In the fourth embodiment described above, the second vehicle information includes at least one of the vehicle type of the second vehicle 20 and the size of the second vehicle 20. Without being limited thereto, the second vehicle information may include the vehicle registration number, which is the number written on the license plate of the second vehicle 20.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described issues, or to provide one of the above-described effects. In order to achieve a part or all, replacement or combination can be appropriately performed. Also, if the technical features are not described as essential in the present specification, they can be deleted as appropriate.

The vehicle position estimating device 1 and the technique according to the present disclosure may be achieved by a dedicated computer provided by constituting a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method described in the present disclosure may be implemented by one or more special purpose computer, which is configured as a combination of a processor and a memory, which are programmed to perform one or more functions, and a processor which is configured with one or more hardware logic circuits. A computer program may be stored in a computer-readable non-transitory tangible recording medium as an instruction executed by a computer.

The invention claimed is:

1. A vehicle position estimating device comprising:

a coordinates obtaining unit configured to obtain coordinates of a first vehicle;

a map information obtaining unit configured to obtain map information including the coordinates obtained by the coordinates obtaining unit;

a surrounding information obtaining unit configured to obtain surrounding information indicating a reference around the first vehicle, the reference being detected by a surrounding sensor installed in the first vehicle;

a vehicle position estimating unit configured to estimate a position of the first vehicle as a first vehicle position using the map information and the surrounding information;

a relative position estimating unit configured to estimate a relative position of each of a plurality of second vehicles around the first vehicle with respect to the first vehicle using the surrounding information, and to determine, among the relative positions of the plurality of second vehicles, a second vehicle which is highest in a degree of accuracy among the relative positions of the plurality of second vehicles;

a correcting unit configured to correct the first vehicle position using the relative position and a second vehicle position that is a position of the second vehicle obtained from the second vehicle; and a driving control unit configured to implement an autonomous driving for traveling along a predetermined route by controlling a driving force control unit, a braking force control unit, and a steering control unit, wherein the first vehicle position estimated by the vehicle position estimating unit is a provisional first vehicle position, the first vehicle position estimated using the second vehicle position and the relative position is a new first vehicle position, and the correcting unit is further configured to:

compare a first accuracy that is a degree of accuracy of the first vehicle position to a second accuracy that is the degree of accuracy of the second vehicle position;

correct the first vehicle position by shifting the first vehicle position to a corrected position closer to the provisional first vehicle position than to the new first vehicle position responsive to the first accuracy being higher than the second accuracy; and correct the first vehicle position by shifting the first vehicle position to the corrected position closer to the new first vehicle position than to the provisional first vehicle position responsive to the second accuracy being higher than the first accuracy.

2. The vehicle position estimating device according to claim 1, wherein the correcting unit is further configured to correct the first vehicle position using the second vehicle position of each of the plurality of second vehicles and the relative position of each of the plurality of second vehicles.

3. The vehicle position estimating device according to claim 1, wherein the correcting unit is further configured to correct the first vehicle position using the relative position and the second vehicle position if the second accuracy is higher than a predetermined threshold.

4. The vehicle position estimating device according to claim 1, further comprising a vehicle information obtaining unit configured to obtain a second vehicle information that includes at least one of a vehicle type of the second vehicle and a size of the second vehicle, wherein the relative position estimating unit is further configured to:

identify the second vehicle among the plurality of vehicles around the first vehicle using the surrounding information and the second vehicle information; and estimate the relative position.

5. The vehicle position estimating device according to claim 1, wherein the coordinates of the first vehicle are information obtained by using a Global Navigation Satellite System of the first vehicle, the coordinates of the second vehicle are information obtained by using a Global Navigation Satellite System of the second vehicle, the degree of accuracy of the first vehicle position is a reception strength of the information obtained by using the Global Navigation Satellite System of the first vehicle, and the degree of accuracy of the second vehicle position is a reception strength of the information obtained by using the Global Navigation Satellite System of the second vehicle.

6. The vehicle position estimating device according to claim 1, wherein the correcting unit is further configured to:

set the corrected position on a straight line between the provisional first vehicle position and the new first vehicle position, such that a ratio of a first distance, which is between the corrected position and the provisional first vehicle position, to a second distance, which is between the corrected position and the new first vehicle position, is equal to a ratio of the first accuracy to the second accuracy.

7. The vehicle position estimating device according to claim 1, wherein the correcting unit is further configured to:

determine a ratio of the first accuracy to the second accuracy, and set the corrected position to a position between the provisional first vehicle position and the new first vehicle position based on the ratio of the first accuracy to the second accuracy.

8. The vehicle position estimating device according to claim 1, wherein the correcting unit is further configured to:

determine a ratio of a first distance, which is between the corrected position and the provisional first vehicle position, to a second distance, which is between the corrected position and the new first vehicle position, determine a ratio of the first accuracy to the second accuracy, and set the corrected position to a position between the provisional first vehicle position and the new first vehicle position based on the ratio of a first distance to the second distance and the ratio of the first accuracy to the second accuracy.

9. The vehicle position estimating device according to claim 1, wherein the correcting unit is further configured to:

set the corrected position on a line between the provisional first vehicle position and the new first vehicle position, such that a ratio of a first distance, which is between the corrected position and the provisional first vehicle position, to a second distance, which is between the corrected position and the new first vehicle position, is equal to a ratio of the first accuracy to the second accuracy.

10. The vehicle position estimating device according to claim 1, wherein the correcting unit is configured to correct the first vehicle position using (i) each second vehicle position of the plurality of second vehicles and (ii) each relative position of the plurality of second vehicles estimated by the relative position estimating unit.

11. The vehicle position estimating device according to claim 1, wherein the correcting unit is configured to correct the first vehicle position to a center of gravity of a polygon or a midpoint of a line segment obtained by connecting new first vehicle positions, the new first vehicle positions being estimated using (i) the second vehicle position of each of the plurality of second vehicles and (ii) the relative position of each of the plurality of second vehicles.

12. A vehicle position estimating system comprising:

a first vehicle;

a plurality of second vehicles around the first vehicle;

a coordinates obtaining unit configured to obtain coordinates of the first vehicle;

a map information obtaining unit configured to obtain map information that includes the coordinates of the first vehicle obtained by the coordinates obtaining unit;

a surrounding information obtaining unit configured to obtain surrounding information indicating a reference around the first vehicle, the reference being detected by a surrounding sensor installed in the first vehicle;

a vehicle position estimating unit configured to estimate a position of the first vehicle as a first vehicle position using the coordinates, the map information, and the surrounding information;

a relative position estimating unit configured to estimate a relative position of each of the plurality of second vehicles with respect to the first vehicle using the surrounding information, and to determine, among the relative positions of the plurality of second vehicles, a second vehicle which is highest in a degree of accuracy among the relative positions of the plurality of second vehicles;

a correcting unit configured to correct the first vehicle position using the relative position and a second vehicle position that is a position of the second vehicle; and a driving control unit configured to implement an autonomous driving for traveling along a predetermined route by controlling a driving force control unit, a braking force control unit, and a steering control unit, wherein the first vehicle position estimated by the vehicle position estimating unit is a provisional first vehicle position, the first vehicle position estimated using the second vehicle position and the relative position is a new first vehicle position, and the correcting unit is further configured to:

compare a first accuracy that is a degree of accuracy of the first vehicle position to a second accuracy that is the degree of accuracy of the second vehicle position;

correct the first vehicle position by shifting the first vehicle position to a corrected position closer to the provisional first vehicle position than to the new first vehicle position responsive to the first accuracy being higher than the second accuracy; and correct the first vehicle position by shifting the first vehicle position to the corrected position closer to the new first vehicle position than to the provisional first vehicle position responsive to the second accuracy being higher than the first accuracy.

13. The vehicle position estimating system according to claim 12, wherein the correcting unit is further configured to:

determine a ratio of the first accuracy to the second accuracy, and set the corrected position to a position between the provisional first vehicle position and the new first vehicle position based on a ratio of the first accuracy to the second accuracy.

14. The vehicle position estimating system according to claim 12, wherein the correcting unit is further configured to:

determine a ratio of a first distance, which is between the corrected position and the provisional first vehicle position, to a second distance, which is between the corrected position and the new first vehicle position, determine a ratio of the first accuracy to the second accuracy, and set the corrected position to a position between the provisional first vehicle position and the new first vehicle position based on the ratio of a first distance to the second distance and the ratio of the first accuracy to the second accuracy.

15. The vehicle position estimating system according to claim 12, wherein the correcting unit is further configured to:

set the corrected position on a line between the provisional first vehicle position and the new first vehicle position, such that a ratio of a first distance, which is between the corrected position and the provisional first vehicle position, to a second distance, which is between the corrected position and the new first vehicle position, is equal to a ratio of the first accuracy to the second accuracy.

16. A method for estimating a vehicle position comprising:

obtaining coordinates of a first vehicle;

obtaining map information including the coordinates;

obtaining surrounding information indicating a reference around the first vehicle;

estimating a position of the first vehicle as a first vehicle position using the coordinates, the map information, and the surrounding information;

estimating a relative position of each of a plurality of second vehicles around the first vehicle with respect to the first vehicle using the surrounding information, and to determine, among the relative positions of the plurality of second vehicles, a second vehicle which is highest in a degree of accuracy among the relative positions of the plurality of second vehicles;

obtaining a second vehicle position that is a position of the second vehicle;

correcting the first vehicle position using the second vehicle position and the relative position; and implementing an autonomous driving for traveling along a predetermined route by controlling a driving force control unit, a braking force control unit, and a steering control unit, wherein the first vehicle position being estimated using the coordinates, the map information, and the surrounding information is a provisional first vehicle position, the first vehicle position being estimated using the second vehicle position and the relative position is a new first vehicle position, and the method further comprising:

comparing a first accuracy that is a degree of accuracy of the first vehicle position to a second accuracy that is the degree of accuracy of the second vehicle position;

correcting the first vehicle position by shifting the first vehicle position to a corrected position closer to the provisional first vehicle position than to the new first vehicle position responsive to the first accuracy being higher than the second accuracy; and correcting the first vehicle position by shifting the first vehicle position to the corrected position closer to the new first vehicle position than to the provisional first vehicle position responsive to the second accuracy being higher than the first accuracy.

17. The method according to claim 16, further comprising determining a ratio of the first accuracy to the second accuracy, and setting the corrected position to a position between the provisional first vehicle position and the new first vehicle position based on the ratio of the first accuracy to the second accuracy.

18. The method according to claim 16, further comprising determining a ratio of a first distance, which is between the corrected position and the provisional first vehicle position, to a second distance, which is between the corrected position and the new first vehicle position, determining a ratio of the first accuracy to the second accuracy, and setting the corrected position to a position between the provisional first vehicle position and the new first vehicle position based on the ratio of the first distance to the second distance and the ratio of the first accuracy to the second accuracy.

19. The method according to claim 16, further comprising setting the corrected position on a line between the provisional first vehicle position and the new first vehicle position, such that a ratio of a first distance, which is between the corrected position and the provisional first vehicle position, to a second distance, which is between the corrected position and the new first vehicle position, is equal to a ratio of the first accuracy to the second accuracy.

20. A vehicle position estimating device comprising:

at least one of (i) a circuit and (ii) a processor having a memory storing computer program code, wherein the at least one of the circuit and the processor having the memory is configured to cause the vehicle position estimating device to perform:

obtaining coordinates of a first vehicle;

obtaining map information including the coordinates;

obtaining surrounding information indicating a reference around the first vehicle, the reference being detected by a surrounding sensor installed in the first vehicle;

estimating a position of the first vehicle as a first vehicle position using the map information and the surrounding information;

estimating a relative position of each of a plurality of second vehicles around the first vehicle with respect to the first vehicle using the surrounding information, and determining, among the relative positions of the plurality of second vehicles, a second vehicle which is highest in a degree of accuracy among the relative positions of the plurality of second vehicles;

correcting the first vehicle position using the relative position and a second vehicle position that is a position of the second vehicle obtained from the second vehicle; and implementing an autonomous driving for traveling along a predetermined route by controlling a driving force control device, a braking force control device, and a steering control device, wherein the first vehicle position which is estimated is a provisional first vehicle position, the first vehicle position being estimated using the second vehicle position and the relative position is a new first vehicle position, and the at least one of the circuit and the processor is further configured to cause the vehicle position estimating device to perform:

comparing a first accuracy that is a degree of accuracy of the first vehicle position to a second accuracy that is the degree of accuracy of the second vehicle position;

correcting the first vehicle position by shifting the first vehicle position to a corrected position closer to the provisional first vehicle position than to the new first vehicle position responsive to the first accuracy being higher than the second accuracy; and correcting the first vehicle position by shifting the first vehicle position to the corrected position closer to the new first vehicle position than to the provisional first vehicle position responsive to the second accuracy being higher than the first accuracy.

21. The vehicle position estimating device according to claim 20, wherein the at least one of the circuit and the processor having the memory is further configured to cause the vehicle position estimating device to perform:

determining a ratio of the first accuracy to the second accuracy, and setting the corrected position to a position between the provisional first vehicle position and the new first vehicle position based on the ratio of the first accuracy to the second accuracy.

22. The vehicle position estimating device according to claim 20, wherein the at least one of the circuit and the processor having the memory is further configured to cause the vehicle position estimating device to perform:

determining a ratio of a first distance, which is between the corrected position and the provisional first vehicle position, to a second distance, which is between the corrected position and the new first vehicle position, determining a ratio of the first accuracy to the second accuracy, and setting the corrected position to a position between the provisional first vehicle position and the new first vehicle position based on the ratio of a first distance to the second distance and the ratio of the first accuracy to the second accuracy.

* * * * *